United States Patent [19]
Liu

[11] Patent Number: 5,836,800
[45] Date of Patent: Nov. 17, 1998

[54] PINWHEEL

[76] Inventor: Chin-Hsiang Liu, 58, Ma Yuan West St., Taichung, Taiwan

[21] Appl. No.: 825,740

[22] Filed: Apr. 3, 1997

[51] Int. Cl.$^6$ ........................................... A63H 1/00
[52] U.S. Cl. ............................................... 446/236
[58] Field of Search .................................. 446/217, 218, 446/236, 237, 238; 416/219 A, 219 R, 220 A, 220 R; 40/440; D21/93; D23/370

[56] References Cited

U.S. PATENT DOCUMENTS

| | | | |
|---|---|---|---|
| 454,804 | 6/1891 | Murphy | 446/217 |
| 1,426,581 | 8/1922 | McKee | 416/220 A |
| 2,656,146 | 10/1953 | Sollinger | 416/219 R |
| 4,669,164 | 6/1987 | Phelps | 416/219 A |
| 5,659,988 | 8/1997 | Kim et al. | 40/440 |

*Primary Examiner*—Max Hindenburg
*Assistant Examiner*—Charles Marmor, II

[57] ABSTRACT

A pinwheel comprises a rotating seat, a screw rod passing through the rotating seat, a head disposed on a top end of the screw rod, and a plurality of blades connected to the rotating seat. The screw rod has a tip end. The rotating seat has a center hole, a plurality of periphery recesses, a plurality of enlarged grooves, a round hole, and a plurality of blocking plates. Each of the periphery recesses communicating with each of the corresponding enlarged grooves. A plug has a guide plate. The guide plate has a camber edge. The guide plate is inserted in the round hole. A spring is inserted in the round hole. A screw screws the round hole. Each of the blades has a post. The screw rod has a screw recess to receive the camber edge. Each of the posts is inserted in each of the corresponding enlarged grooves. Each of the blades is inserted in each of the corresponding periphery recesses.

2 Claims, 5 Drawing Sheets

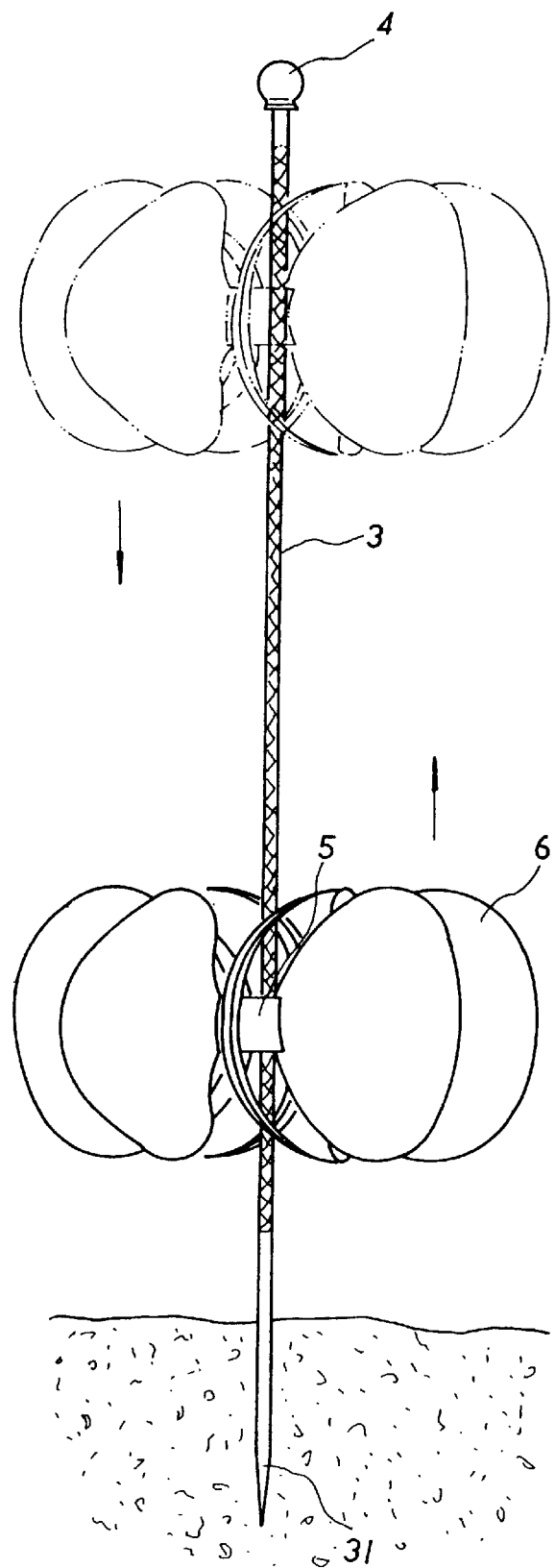
F I G. 5

PINWHEEL

BACKGROUND OF THE INVENTION

The present invention relates to a pinwheel. More particularly, the present invention relates to a pinwheel which has a rotating seat to move upward and downward according to a direction of a wind.

Referring to FIG. 1, a conventional pinwheel (as shown in the figures of U.S. Pat. No. 5,083,963). Has a rod 1 and a plurality of blades 2. An axle (not shown in the figure) which is disposed on the rod 1 positions the blades 2 pivotally. A ball 3 is disposed on an outer end of the axle to block the blades 2. However, the blades 2 cannot be moved upward or downward while rotating.

SUMMARY OF THE INVENTION

An object of the present invention is to provide a pinwheel which has a rotating seat to move upward and downward according to a direction of a wind.

Another object of the present invention is to provide a pinwheel which has a plurality of blades to rotate according to any direction of a wind.

Accordingly, a pinwheel comprises a rotating seat, a screw rod passing through the rotating seat, a head disposed on a top end of the screw rod, and a plurality of blades connected to the rotating seat. The screw rod has a tip end. The rotating seat has a center hole, a plurality of periphery recesses, a plurality of enlarged grooves, a round hole, and a plurality of blocking plates integral with the rotating seat. Each blocking plate extends from the rotating seat adjacent to one of the periphery recesses. Each of the periphery recesses communicating with one of the respective enlarged grooves. A plug has a guide plate. The guide plate has a camber edge. The guide plate is inserted in the round hole. A spring is inserted in the round hole. A screw is inserted in the round hole. Each of the blades has a post. The screw rod has a screw recess to receive the camber edge. Each of the posts is inserted in one of the corresponding enlarged grooves. Each of the blades is inserted in one of the corresponding periphery recesses.

BRIEF DESCRIPTION OF THE DRAWINGS

FIG. 5 is a schematic view illustrating the upward and downward motion of a rotating seat.

DETAILED DESCRIPTION OF THE INVENTION

Figure 1:
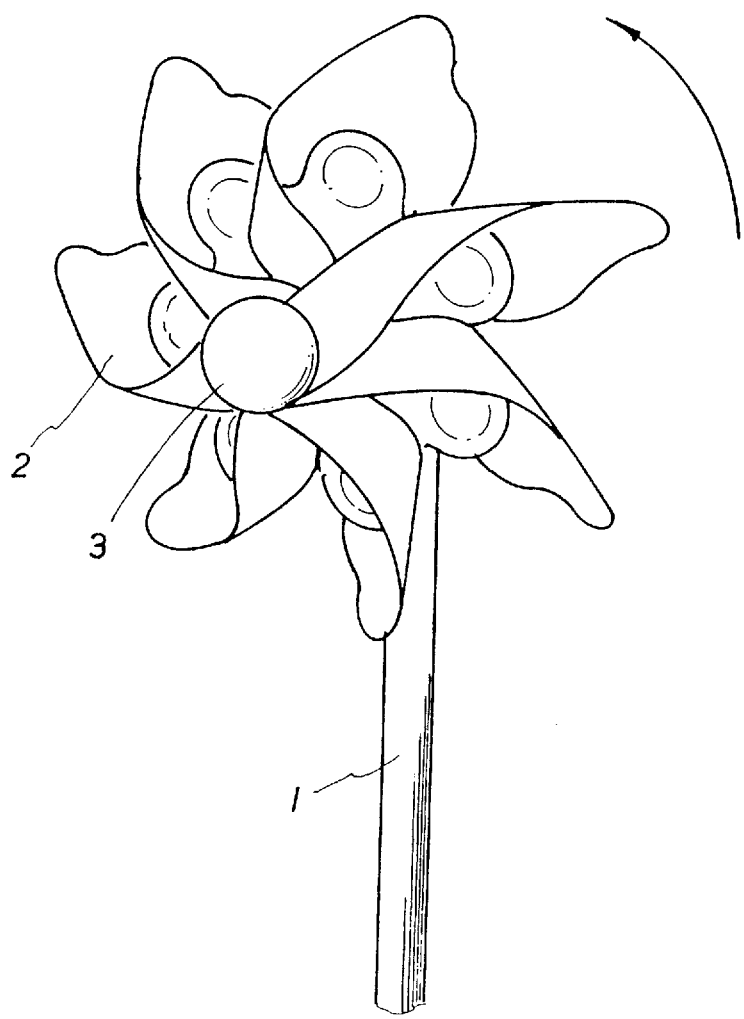
FIG. 1 is a perspective view of a pinwheel of the prior art.
Figure 2:
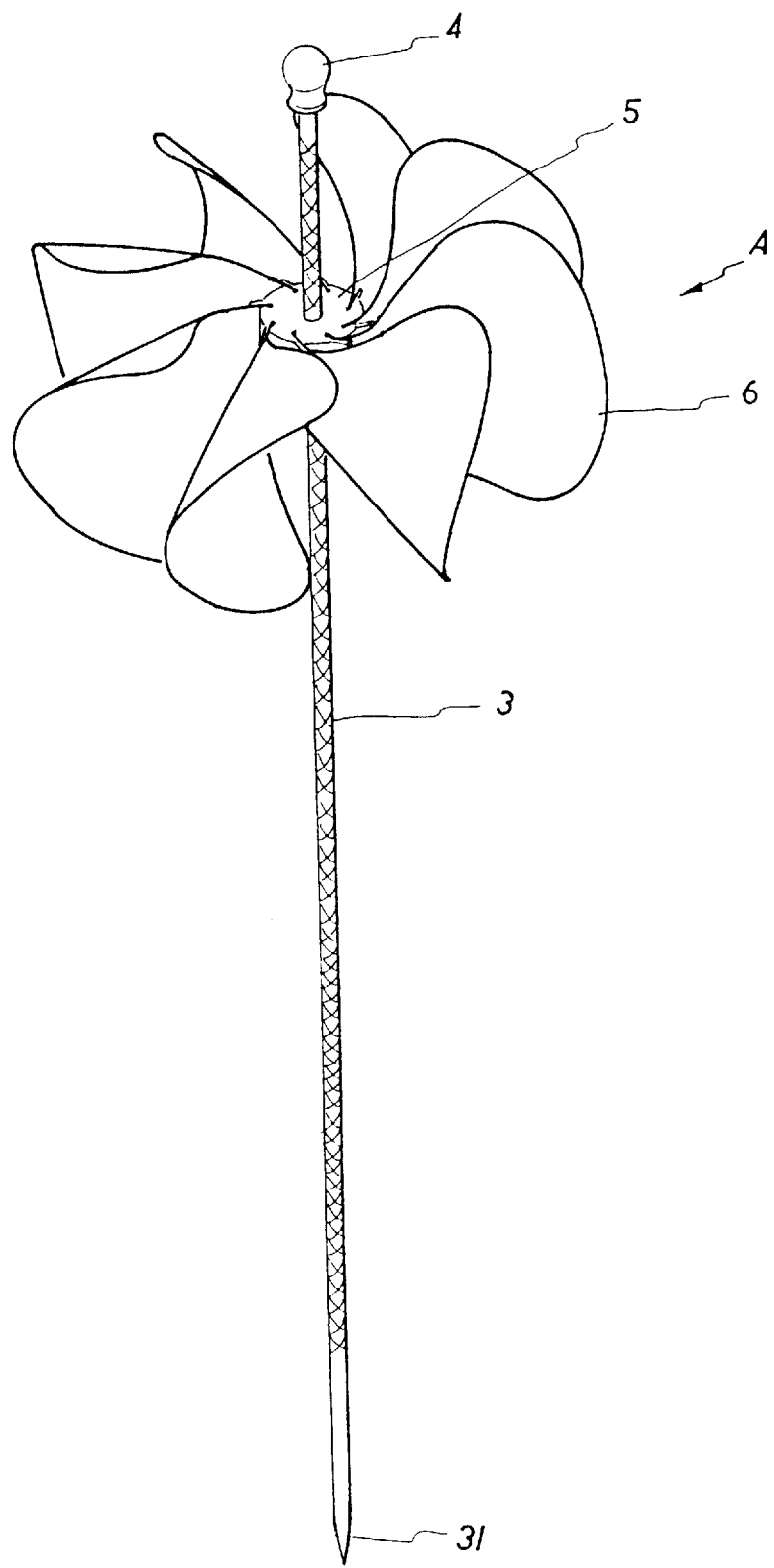
FIG. 2 is a perspective view of a pinwheel of a preferred embodiment in accordance with the present invention.
Figure 3:
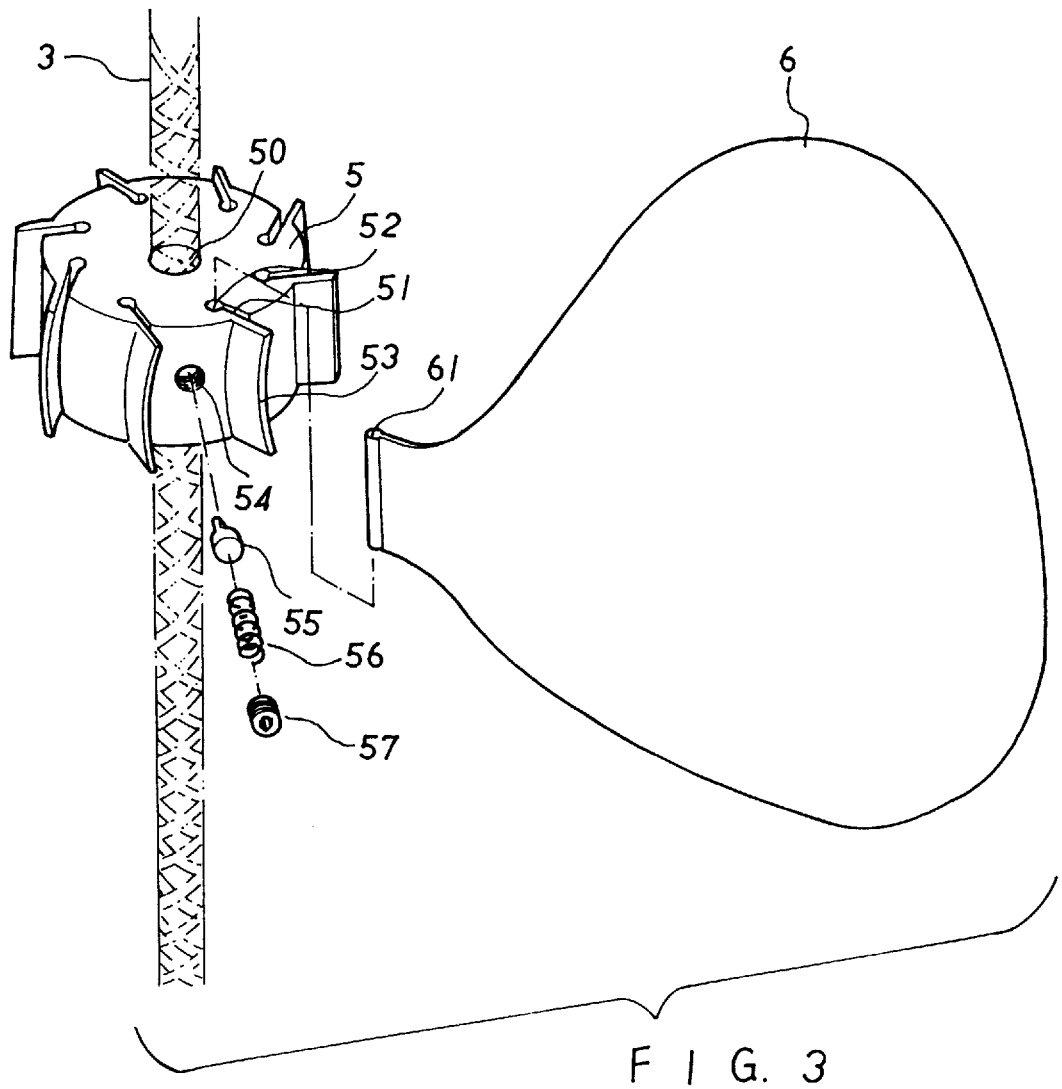
FIG. 3 is a partially perspective exploded view of a pinwheel of a preferred embodiment in accordance with the present invention.
Figure 3A:
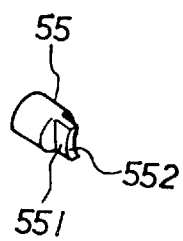
FIG. 3A is a perspective view of a plug.
Figure 4:
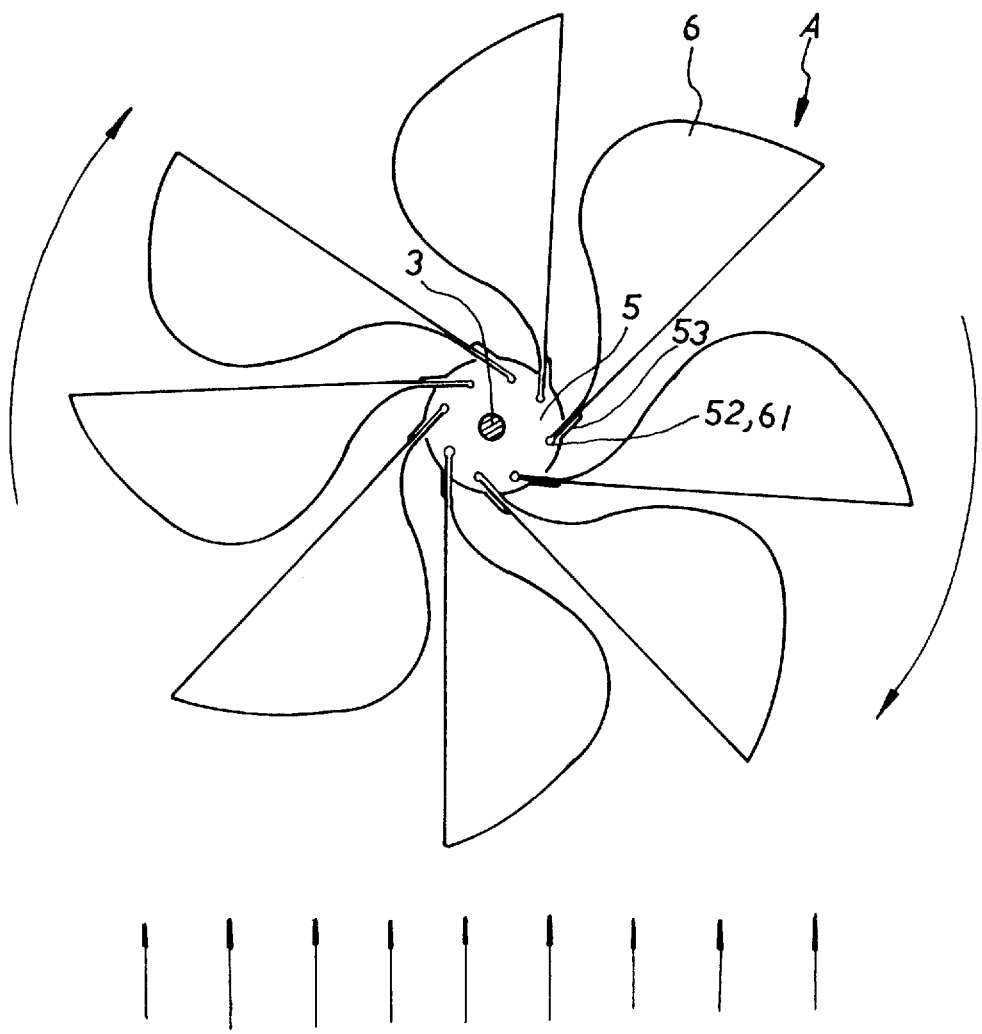
FIG. 4 is a schematic view illustrating the rotation of the blades.

Referring to FIGS. 2 to 5, a pinwheel A comprises a rotating seat 5, a screw rod 3 which has two opposite ends passing through the rotating seat 5, a head 4 disposed on a top end of the screw rod 3, and a plurality of blades 6 connected to the rotating seat 5. The screw rod 3 has a tip end 31. The rotating seat 5 has a center hole 50, a plurality of periphery recesses 51, a plurality of enlarged grooves 52, a round hole 54, and a plurality of blocking plates 53. Each of the periphery recesses 51 communicates with one of the respective enlarged grooves 52. A plug 55 has a guide plate 551. The guide plate 551 has a camber edge 552. The guide plate 551 is inserted in the round hole 54. A spring 56 is inserted in the round hole 54. A screw 57 is inserted in the round hole 54. Each of the blades 6 has a post 61. The screw rod 3 has a screw recess to receive the camber edge 552. Each of the posts 61 is inserted in one of the corresponding enlarged grooves 52. Each of the blades 6 is inserted in one of the corresponding periphery recesses 51.

Since the camber edge 552 can move along the screw recess of the screw rod 3 while the wind blows, the rotating seat 5 can move upward and downward according to the direction of the wind. The blades 6 can rotate according to any direction of the wind.

The invention is not limited to the above embodiment but various modification thereof may be made. Further, various changes in form and detail may be made without departing from the scope of the invention.

I claim:

1. A pinwheel comprising:

a rotating seat, a screw rod having two opposite ends and passing through the rotating seat, a head disposed on a top end of the screw rod, a plurality of blades connected to the rotating seat, the rotating seat having a center hole, a plurality of periphery recesses, a plurality of enlarged grooves, a round hole, and a plurality of blocking plates integral with the rotating seat, each blocking plate extending from the rotating seat adjacent to one of the periphery recesses, each of the periphery recesses communicating with one of the enlarged grooves, a plug having a guide plate, the guide plate having a camber edge, the screw rod having a screw recess to receive the camber edge, the guide plate inserted into the round hole, a spring inserted in the round hole, a screw inserted in the round hole, each of the blades having a post, each of the posts inserted in one of the enlarged grooves, and each of the blades inserted in one of the periphery recesses.

2. A pinwheel as claimed in claim 1, wherein the screw rod has a tip end.

* * * * *